March 13, 1956 P. T. BAILEY 2,738,164
EARTH BORING DEVICE
Filed Feb. 20, 1953 2 Sheets-Sheet 2
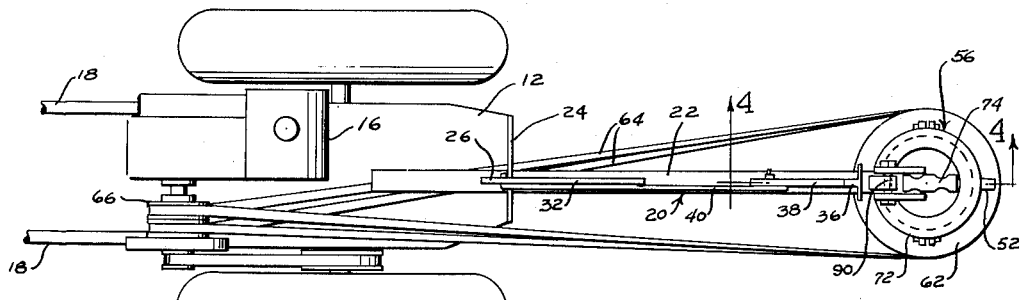
Fig. 2
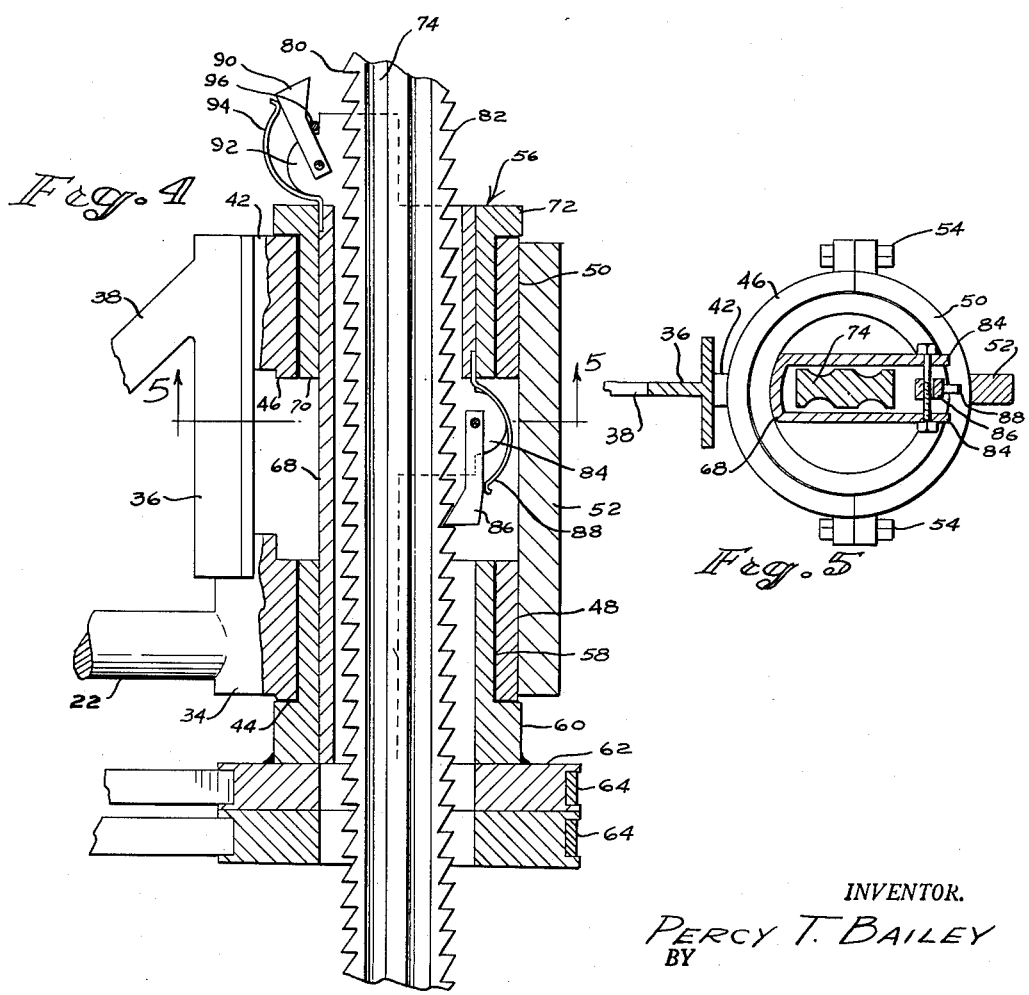
Fig. 4
Fig. 5
INVENTOR.
PERCY T. BAILEY
BY
McMorrow, Berman & Davidson
ATTORNEYS

United States Patent Office 2,738,164
Patented Mar. 13, 1956

2,738,164

EARTH BORING DEVICE

Percy T. Bailey, Newport, R. I.

Application February 20, 1953, Serial No. 338,022

4 Claims. (Cl. 255—22)

This invention relates to earth boring equipment or augers, such as those used in digging post holes.

The main object of the present invention is to provide a generally improved earth boring device adapted to be detachably connected to a garden tractor.

Another object of importance is to provide a device as stated which can be attached or detached from its associated tractor with substantial ease and speed.

Another object is to provide an earth auger which will be mountable in operative association with a garden tractor without requiring substantial modification or redesign of said tractor.

Another object of importance is to provide, in an earth boring device of the character referred to, a means whereby the device will be tiltably adjustable about an axis extending transversely thereof, to compensate for different ground contours and grades encountered during digging operations.

Another object is to provide an earth boring device including a rotary drill stem having oppositely inclined, longitudinal series of rack teeth along opposite edges thereof, said drilling stem being mounted to rotate with a drill stem support assembly, which assembly will include individual pawls selectively engageable with the teeth at opposite sides of the drill stem, for use in raising and lowering the drill stem relative to the ground.

Another object of importance is to provide earth boring equipment of the type stated which will comprise a plurality of separable, individual assemblies capable of being readily disconnected from one another for ease in cleaning, lubrication, maintenance, and replacement of parts.

Still another object is to provide earth boring equipment of the type stated which will be power driven, with the power being taken from the garden tractor engine, with the boring device being nevertheless adapted for manufacture at a cost sufficiently low to permit its purchase with a minimum outlay of money.

Other objects will appear from the following description, the claims appended thereto, and from the annexed drawings, in which like reference characters designate like parts throughout the several views, and wherein:

Figure 2 is a top plan view of the garden tractor and earth boring device;

Figure 3 is a transverse sectional view on line 3—3 of Figure 1, showing the means whereby the earth boring device is mounted for tiltable adjustment;

Figure 4 is an enlarged longitudinal sectional view taken substantially on line 4—4 of Figure 2; and Figure 5 is a transverse sectional view on line 5—5 of Figure 4.

Figure 1:
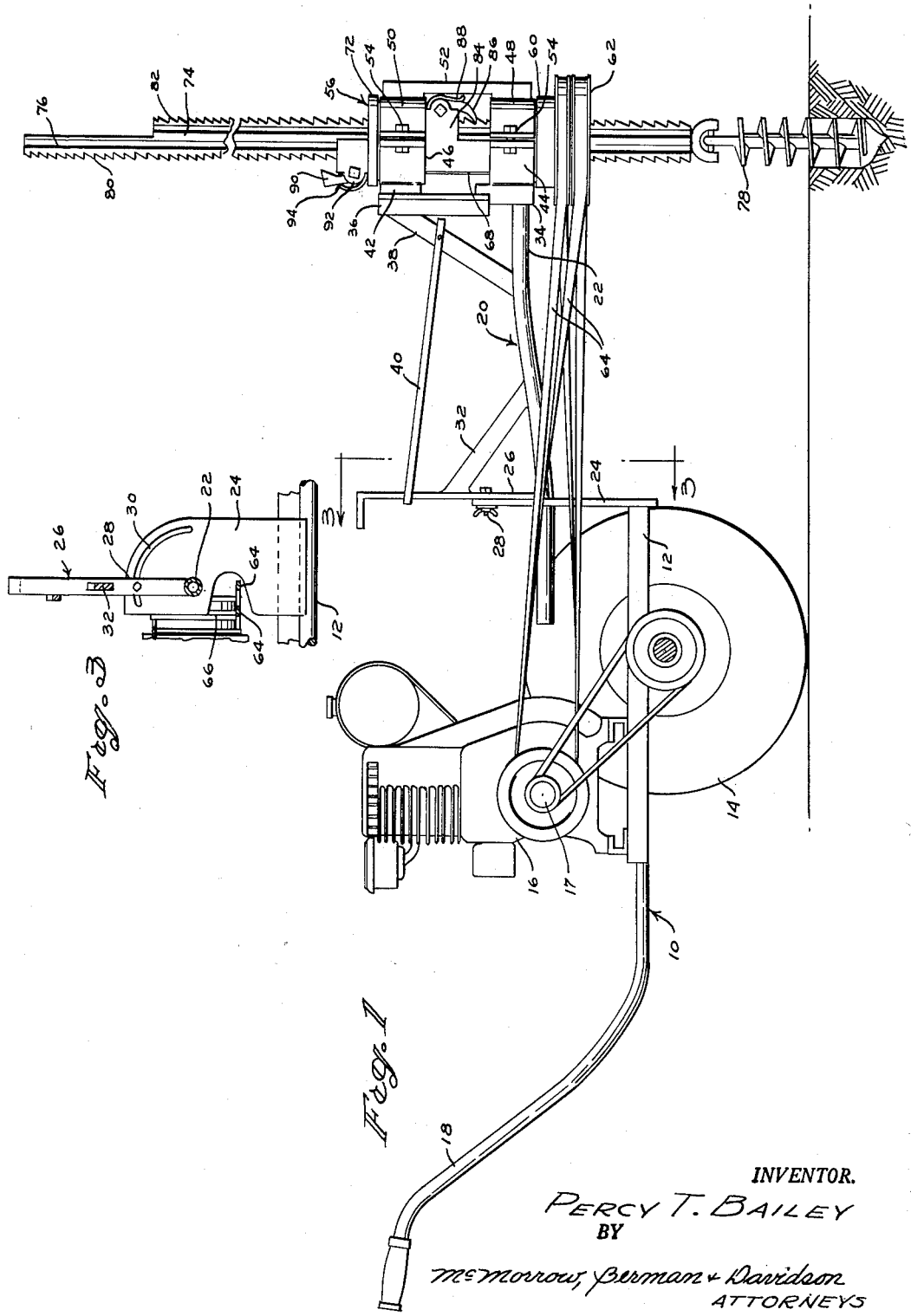
Figure 1 is a side elevational view of an earth boring device formed in accordance with the present invention, as it appears when mounted upon a garden tractor.

Referring to the drawings in detail, the earth boring device constituting the present invention is adapted to be mounted upon a conventional garden tractor designated generally at 10. The garden tractor includes a frame 12 supported by ground wheels 14, said frame supporting, in turn, an internal combustion engine 16 having a drive shaft 17 extending therefrom. Handles 18 extend rearwardly from the frame 12.

The invention has been designated generally by the reference numeral 20, and includes a main support bar 22 of substantial length, said support bar being bent at locations spaced longitudinally thereof (see Figure 1), so as to offset the opposite ends of the support bar from one another, longitudinally of the bar. The bar 22 can be formed from a suitable length of tubular or pipe stock.

A mounting plate 24 is rigidly secured along its lower edge to, and extends upwardly from, the front portion of frame 12, said mounting plate lying in a plane disposed transversely of the main support bar. The mounting plate, intermediate its ends, has an opening adapted to receive the inner end of the main support bar 22. It will be understood that the main support bar will not be fixedly secured within said opening, this arrangement being desirable to permit the earth boring device to be detached from the garden tractor 10. The mounting plate 24 will, however, remain permanently affixed to the tractor.

An adjusting arm 26, secured fixedly at its lower end to bar 22, extends upwardly from the bar and is abutted against the mounting plate 24. Intermediate its ends, the adjusting arm 26 has an opening through which is removably positioned a connecting bolt 28 having a wing nut applied thereto. The wing nut engages the plate 24, with the bolt extending through an arcuate slot 30 formed in the upper end portion of said plate.

By reason of this construction, it is seen that the bar 22 is rotatably mounted in plate 24, and can be rotatably adjusted to selected positions. In effecting the rotary adjustment of bar 22, the upper end of the adjusting bar 26, which upper end is extended laterally to provide a handle, can be grasped and the adjusting bar swung laterally in either direction. After the bar 22 has been rotated as desired, the wing nut can be turned home against the plate 24, to hold the bar 22 in the selected position to which it has been adjusted.

In other instances, it might be desired to permit the earth boring device to adjust itself to the contour of the ground, the wing nut then being left loose on the bolt 28 and the adjusting bar 26 swinging freely within the slot 30.

Rigidly secured at one end to the midlength location of the bar 26, and at its other end to an intermediate portion of bar 22, is an angular brace 32, which rigidifies the connection of bars 22 and 26 to one another. A second angular brace 38 is fixedly secured at one end to the bar 22, and extending between and connected to brace 38 and adjusting bar 26 is a reinforcing rod 40.

Referring to Figure 4, the second brace 38, at its other end, is fixedly secured to a depending frame member 36 of T-shaped cross section having a rigid connection at its lower end to a lower, rectangularly and solidly formed, bearing block 34.

Bearing block 34 is rigid with, and hence will rotate with, the main support bar 22, at the outer end of said main support bar. Since the outer end of the main support bar is offset from the axis of rotation of said bar, block 34 will shift through an arcuate path, about an axis extending transversely thereof, on rotary adjustment of the main support bar 22.

An upper bearing block 42 is spaced vertically of and above the block 34, and has a rigid connection to the upper end of frame member 36.

Integral with the lower bearing block 34 is a semi-circular lower bearing member 44 disposed below and aligned vertically with an upper, semi-circular bearing member 46 integral with upper block 42.

A removable, semi-circular, bearing member 48 has ears at its opposite ends engageable against ears formed on the opposite ends of the bearing member 44, a removable upper bearing member 50 being similarly formed for engagement against corresponding ears provided upon the opposite ends of the bearing member 46. Bolts 54 extend between the several pairs of abutting ears.

By reason of this arrangement, vertically spaced, annular bearings are provided, said bearings being rigid with the main support bar 22 and hence being tiltably adjustable about an axis extending transversely thereof.

The bearing members 48 and 50 are fixedly connected in spaced relation by a connecting bar 52, said bar 52 being rigidly attached at its opposite ends to the members 48 and 50.

It will be seen that there is thus defined a support frame for the rotary assembly 56 of the apparatus. The rotary assembly 56, in this connection, includes a lower sleeve 58 journaled for rotation in the lower bearing defined by bearing members 44, 48. Sleeve 58, at its lower end, is formed with an annular flange defining a circumferential shoulder 60 engaging against the bottom edge of the bearing in which the sleeve is journaled.

Welded or otherwise rigidly secured to the lower end of the sleeve 58 is a double pulley 62, said pulley constituting a driven pulley and having a pair of belts 64 trained therearound. Belts 64 are also trained about a double drive pulley 66 secured to the shaft 17 of engine 16.

Fixedly mounted within the sleeve 58 is an elongated, open ended drill stem housing 68 of channel formation. Said housing, at its upper end, is fixedly secured within an upper sleeve 70 journaled for rotation in the bearing defined by bearing members 46, 50.

The upper sleeve 70, at its upper end, is formed with a circumferential shoulder 72 bearing against the upper edge of the bearing associated therewith. As a result, movement of the sleeves and the drill stem support housing longitudinally of their axis of rotation is prevented.

With the shoulder 72 carried upon the upper surface of the bearing formed by members or bearing segments 46, 50 and the shoulder 60 engaging the lower surface of the bearing formed by the member or bearing segments 44, 48 and the lower surface of the annular flange defining shoulder 60 being fixedly secured upon and carried by the upper surface of the top one of the pulleys 62, it will be seen that the sleeve 58, the stem housing fixedly mounted within the sleeve 58 and the sleeve 70 within which the housing 68 is fixedly secured at its upper end, will all rotate within the bearings 44, 48 and 46, 50 in response to the rotational drive imparted to the sleeve 58 by the pulleys 62 and operatively associated with a double drive pulley on the drive shaft 17 of the motor 16 by belts 64.

As will be readily seen in Figure 5, the drill stem 74 is contained within the channel formation defined by the stem housing 68, so that as the stem housing 68 is rotated in the manner hereinbefore described, the interior of the stem housing will engage the stem 74, so that the stem 74 will be caused to rotate with the housing 68, the stem 74, while being rotated, may still be permitted downward movement by the operation of the pawl 86 and the teeth 82.

A drill stem has been designated by the reference numeral 74 and is mounted in the support housing 68 to shift upwardly and downwardly in the direction of its length.

As will be seen from Figure 5, drill stem 74 is generally rectangular in cross section, and though shiftable longitudinally of its associated housing 68, will be rotated with and by said housing.

At its upper end the drill stem (see Figure 1) is formed with a longitudinal extension 76, said extension being at one side of the drill stem, and extending, when considered from the standpoint of its cross sectional configuration, approximately half the overall width of the drill stem.

That side of the drill stem on which the extension 76 is formed has a longitudinal series of downwardly inclined rack teeth 80, the opposite side of the drill stem having a longitudinal series of upwardly inclined rack teeth 82.

At a location between the bearing sleeves 58, 70, the channeled housing 68 is integrally formed with ears 84, and extending between said ears, as shown in Figure 5, is a pivot pin on which is swingably mounted a depending pawl 86. Pawl 86 is adapted to engage between selected rack teeth 82, the pawl being so disposed and formed as to offer no interference to downward movement of the drill stem, while at the same time holding the drill stem against upward movement within the housing 68.

A spring 88, anchored in the housing 68, is tensioned to exert pressure against pawl 86 tending to urge the same in the direction of the rack teeth 82.

A second pawl 90 is pivotally mounted between ears 92 formed upon the upper end of the housing 68, the pawl 90 extending upwardly from its pivotal connection, and being yieldably forced in the direction of teeth 80 by means of a spring 94 engaging said pawl 90 and anchored in the upper end of the housing 68.

The weight of the rotary assembly 56 and the frame support therefor is such that the combined structure will tend to bear against the pawl 86 in such manner that the drill bit 78 secured to the lower end of the drill stem 74 will rest upon the surface of the ground. The stem 74 may be fed downwardly in the housing 68 and into the earth in successive stages by the pawl 86 coacting with the teeth 82 in a manner that will presently appear.

A pin 96 can be used to hold pawl 90 out of engagement with rack teeth 80, when the drill stem is being fed downwardly within the housing 68. The pin 96 would be removed whenever the drill stem is to be raised, and would at this time be inserted between pawl 86 and ears 84, to hold pawl 86 out of engagement with rack teeth 82.

In Figures 3 and 4, it will be seen that the pawl 90 is spaced above the pawl 86, so that when the pawl 86 engages the upper section of the teeth 82, the pawl 90 may be operative by engaging the teeth 80 on the extension 76. In other words, the extension 76 is provided so that the extent of the teeth 80 may extend upwardly beyond the uppermost teeth 82 to compensate for the spacing between the pawls 86 and 90.

It will be seen that the rotary assembly is a self-contained unit, which can be removed from the remaining component parts of the device by extraction of bolts 54. When said bolts are removed, the sectionally formed bearings for the rotary assembly will be disassembled, thereby to permit removal of the rotary assembly as a unit. Similarly, the stationary supporting frame comprising the sectional bearings and main bar 22 is also a single unit, removable from the support frame of the tractor.

In use of the device, the engine 16 is operated to impart rotary movement to the rotary assembly 56. It will be understood that before said assembly is rotated, a suitable, conventionally designed drill bit 78 will be secured to the lower end of the drill stem, by a universal joint.

On rotation of the drill stem, the bit will be forced into the earth, this action being obtained by reason of the weight of the rotary assembly support frame and the rotary assembly. During the drilling the pawls will be arranged as shown in Figure 4, and movement of the bit into the earth will be further effected by the operator's moving handles 18 upwardly and downwardly. Thus, when the operator moves handles 18 upwardly, the entire earth boring assembly at the other end of the combined tractor and earth boring structure will be urged downwardly, the earth boring device pivoting about the axis of the ground wheels 14 of the tractor. Pawl 86, being engaged with the teeth 82 will, of course, thus be caused to force the drill stem downwardly.

The worker then presses downwardly on the handles 18, and this will cause the support frame of the earth boring device, and the bearing sleeves 58, 70, together with the channeled housing 68, to be shifted upwardly relative to the drill stem, the pawl 86 now ratcheting over the teeth 82. The user then, once more, pulls upwardly on the handles 18, and again the pawl 86, engaging above a new tooth, will exert downward pressure thereagainst tending to urge the drill stem into the earth. The bit 78, as will be appreciated, will itself tend to bore downwardly, and will hold the drill stem against accidental upward movement during the operation.

When the drilling has been competed, the pin 96 is removed from the position shown in Figure 4, and it is inserted in front of pawl 86. Pawl 90 will now be engaged with teeth 80, and up and down movement on the handles 18 will now be effective to pull the drill stem upwardly. While the drill stem is being pulled upwardly out of the earth, it will still be rotated, since this will facilitate the extraction of the bit and will cause the bit to bring up with it most of the loose earth for deposit of said loose earth outside the hole.

Also, as previously noted, the entire drilling assembly can be tiltably adjusted about an axis extending transversely thereof, by reason of the adjusting means shown in Figure 3. Thus, the garden tractor might be tilted transversely because of its being supported on a slight down-grade or uneven ground. The hole may still be dug vertically, however, by effecting rotary adjustments of the main bar 22 in the manner described hereinbefore.

It should be noted that with the worker depressing the handles 18, the support frame will be inclined upwardly with respect to the ground surface from the handle to the drill stem, however, due to the universal joint securing the drill bit 78 to the drill stem 74, the drill bit will remain in a vertical position with respect to the ground surface, so that no strain will be placed upon the drill bit as the frame support is oscillated in a vertical plane, as hereinbefore described.

Thus, in the device of this invention there are means provided for oscillation of the rotary assembly 56 during the rotation thereof and the drill stem housing 68 carried thereby with respect to the ground surface. In effect, the rotary assembly 56 is adapted to be mounted for oscillatory motion relative to the ground surface. In its downward movement, the assembly 56 moves longitudinally along with the drill stem 74 due to the holding action of the pawl 86 engaging with the teeth 82; in its upward longitudinal movement, the rotary assembly 56 moves relative to the stem 74, as well as in relation to the ground surface, since the stem 74 will not be carried upwardly with the upward movement of the assembly. So that the teeth 80 and 82 operatively engageable with the respective pawls 86 and 90 define interengageable means carried by the drill stem housing 68 and drill stem 74 to prevent movement of the drill stem with the housing in one direction, while allowing the housing to move longitudinally of the stem in the other direction.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a tractor having a source of power and a pair of ground-engaging wheels and a horizontally disposed frame supported intermediate its ends on said wheels for tilting up and down movement, an earth boring device positioned adjacent one end of said frame and connected to said frame for movement with the latter, said device comprising a support frame mounted on said tractor frame for vertical tilting up and down movement therewith relative to a ground surface, bearings carried by said support frame and movable therewith, a vertically disposed drill stem housing having spaced sides, means carried by said bearings and connected to said housing for rotatably mounting said housing and for moving said housing with said support frame, means operatively connecting said source of power to said first-mentioned means to cause rotation of said housing, a drill stem having one transverse dimension greater than the distance between said sides of said housing disposed within said housing for movement longitudinally therethrough and engageable by said sides for rotation with the housing, interengageable pawl and rack means carried by said housing and said stem to permit said stem to move longitudinally with said housing as said support frame is tilted in one direction and permitting the housing to move longitudinally of said stem when said support frame is tilted in the other direction.

2. In a tractor having a source of power and a pair of ground-engaging wheels and a horizontally disposed frame supported intermediate its ends on said wheels for tilting up and down movement, an earth boring device adjacent one end of said frame and connected to said frame for movement with the latter, said device comprising a support frame mounted on said tractor frame for vertical tilting up and down movement therewith relative to a ground surface, a support mounted on said support frame at the end thereof remote from said one end of said tractor frame for movement with said support frame, a pair of axially aligned bearings carried by said support in spaced vertical relation longitudinally of said support and movable therewith, a rotary assembly rotatably carried in said bearings for movement therewith, said rotary assembly comprising a sleeve mounted in each of said bearings for rotational movement relative thereto, one of said sleeves being operatively connected to the source of power so as to have rotational movement imparted thereto, a drill stem housing having spaced sides secured to said sleeves therewithin and extending vertically therebetween to connect said sleeves together and rotatable by said one sleeve to impart this rotation to the other of said sleeves, a drill stem disposed within said housing and having one transverse dimension greater than the distance between said sides of said housing for movement longitudinally through said housing and engageable by said sides for rotation with the housing, said stem having toothed rack means thereon, pawl means carried by said housing, said pawl means being engageable with said rack means to carry said stem with said assembly as the support frame is tilted in one direction with respect to the ground surface and permit said assembly to move longitudinally of said stem when the support frame is tilted in the other direction.

3. In a tractor having a source of power and a pair of ground-engaging wheels and a horizontally disposed frame supported intermediate its ends on said wheels for tilting up and down movement and a mounting plate carried on said frame at one end thereof for movement therewith; an earth boring device comprising a support frame removably mounted on said plate for movement therewith, a pair of axially aligned bearings carried by said support frame in vertically spaced relation adjacent the end of the support frame remote from said one end of said tractor frame for movement with said support frame, a rotary assembly carried in said bearings for movement therewith; said rotary assembly comprising a sleeve mounted in each of said bearings for rotational movement relative thereto, one of said sleeves being operatively connected to the source of power so as to have rotational movement imparted thereto, a drill stem housing secured to said sleeves therewithin and extending therebetween for having rotation imparted thereto by said one sleeve and transmitting this rotation to the said other sleeve, a drill stem housing having spaced sides secured to said sleeves therewithin and extending therebetween for rotation therewith; a drill stem having one transverse dimension greater than the distance between said sides of said housing disposed within said housing for movement longitudinally therethrough and engageable by said sides for rotation with the housing, said stem having a toothed rack means thereon, pawl means carried by said housing, said pawl means being engageable with said rack means to carry said stem with said housing as the assembly is tilted in one direction with respect to the ground surface and to permit said housing to move longitudinally of said stem as said assembly is tilted in the other direction, and means carried by said plate and operatively connected to said support frame whereby said support frame can be rotatably adjusted about its transverse axis.

4. In a tractor having a source of power and a pair of ground-engaging wheels and a horizontally disposed frame supported intermediate its ends on said wheels for tilting up and down movement, an earth boring device positioned adjacent one end of said tractor frame and connected to said tractor frame for movement with the latter, said device comprising a support frame mounted on said tractor frame for vertical tilting up and down movement therewith relative to a ground surface, spaced bearings carried by said frame and movable therewith, a vertically disposed drill stem housing, means carried by said bearings and connected to said housing for rotatably mounting said housing in said bearings and for moving said housing with said support frame, means operatively connecting said source of power to said first-mentioned means to cause rotation of said housing, said housing having an interior channel formation opening through one end of the housing and extending longitudinally of said housing, a drill stem disposed within said channel formation for movement longitudinally thereof and being of such configuration as to be engageable by the inner faces of said sides of said channel formation as the housing is rotated to have the rotation of said housing imparted to said stem, interengageable pawl and rack means carried by said housing and said stem to permit said stem to move longitudinally with said housing as said support frame is tilted in one direction and permitting the housing to move longitudinally of said stem when the support frame is tilted in the other direction.

References Cited in the file of this patent
UNITED STATES PATENTS

| | | |
|---|---|---|
| 399,317 | Diggs | Mar. 12, 1889 |
| 978,444 | Freemark | Dec. 13, 1910 |
| 1,971,922 | Smith | Aug. 28, 1934 |
| 2,151,673 | Acker | Mar. 28, 1939 |
| 2,251,506 | Tichy, Jr. | Aug. 5, 1941 |
| 2,490,698 | McClenny | Dec. 6, 1949 |